United States Patent

Dähler et al.

[11] Patent Number: 6,052,296
[45] Date of Patent: Apr. 18, 2000

[54] POWER BREAKER

[75] Inventors: Peter Dähler, Remigen; Osvin Gaupp, Baden; Horst Grüning, Wettingen, all of Switzerland

[73] Assignee: Asea Brown Boveri AG, Baden, Switzerland

[21] Appl. No.: 08/921,387

[22] Filed: Aug. 29, 1997

[30] Foreign Application Priority Data

Nov. 8, 1996 [DE] Germany .......................... 196 46 085

[51] Int. Cl.$^7$ ............................. H02M 7/00; H02M 1/12
[52] U.S. Cl. ................................ 363/71; 363/43; 363/37
[58] Field of Search ................. 363/71, 39, 40, 363/43, 37, 132

[56] References Cited

U.S. PATENT DOCUMENTS

| | | | |
|---|---|---|---|
| 3,919,619 | 11/1975 | Corry .......................................... | 363/71 |
| 4,994,953 | 2/1991 | Hark ............................................ | 363/71 |
| 5,008,797 | 4/1991 | Patel et al. .................................. | 363/43 |
| 5,041,957 | 8/1991 | Dhyanchand et al. ....................... | 363/43 |

FOREIGN PATENT DOCUMENTS

0581322A2  2/1994  European Pat. Off. .

OTHER PUBLICATIONS

"Statischer Umrichter Muldenstein", Fieber, et al., Elektrische Bahnen 93 (1995), pp. 43–48.

"Leistungsstarke statische Frequenzumrichter fur den Bahnverkehr durch die Alpen", Gaupp, et al., ABB Technik, May 1995, pp. 4–10.

"Vollstatische 100–MW–Frequenz–kupplung Bremen", Boech, et al., ABB Technik, Sep. 10, 1996, pp. 4–17.

"Umrichterwerk Jubek", Zimmert, et al., Bahnenergieversorgung, Mar. 1995, pp. 85–92.

*Primary Examiner*—Peter S. Wong
*Assistant Examiner*—Rajnikant B. Patel
*Attorney, Agent, or Firm*—Burns, Doane, Swecker & Mathis, L.L.P.

[57] ABSTRACT

A power converter circuit arrangement which comprises a first power converter and at least one further power converter is specified. The power converters are connected to the DC voltage intermediate circuit and feed a load circuit, in particular a single-phase railway grid. The or each further power converter has an output transformer on the load side. The secondary windings of the output transformers are connected in series with the primary winding of a load transformer, which feeds the load circuit, and the load-side terminals of a first power converter. This permits the turns ratios of the output transformers to be selected to be greater than or equal to one and said turns ratios between said output transformers to be selected to be gradated in a binary or ternary manner, for example. As a result, power converter stages having a gradated output voltage are available, and a finely stepped approximation to a sinusoidal output voltage can be achieved without the necessity of providing an uneconomically large number of stages.

7 Claims, 4 Drawing Sheets

POWER BREAKER

BACKGROUND OF THE INVENTION

1. Field of the Invention

The invention relates to the field of power electronics. It is based on a power converter circuit arrangement according to the preamble of the first claim.

2. Discussion of Background

Such a power converter circuit arrangement is described for example in the article "Leistungsstarke statische Frequenzumrichter für den Bahnverkehr durch die Alpen" [High-power static frequency converters for railway traffic through the Alps], ABB Technik 5/1996, pages 4–10, or in the article "Umrichterwerk Jübek" [Converter works Jübek], Elektrische Bahnen 93 (1995) 3, or in the article "Statischer Umrichter Muldenstein" [Static converter Muldenstein], Elektrische Bahnen 93 (1995) 1/2.

In principle, either the so-called two-point invertor or three-point invertor technology is used in the circuit arrangements according to the prior art. A plurality of power converter units having a transformer on the output side are provided, which transformer feeds a load circuit via a common or separate, load- or railway-side secondary winding. If the secondary windings are separate, they are connected in series.

With the designs according to the prior art, a finely stepped output voltage is achieved by a multiplicity of individual stages whose output voltages are added. The requisite GTOs, their circuitry and, in particular, the outlay for the transformers can considerably increase the production cost of the circuit arrangement.

SUMMARY OF THE INVENTION

Accordingly, one object of the invention is to provide a novel power converter circuit arrangement with which a finely stepped output voltage can be obtained with fewer transformers and can thus be produced more cost-effectively.

This object is achieved, in the case of a power converter circuit arrangement of the type mentioned in the introduction, by means of the features of the first claim.

The essence of the invention, then, is that the secondary windings of the output transformers are connected in series with the primary winding of a load transformer and the load-side terminals of a first power converter. This permits the turns ratios between the output transformers to be gradated in a binary or ternary manner, for example. As a result, power converter stages with different output voltages are available, and a finely stepped approximation to a sinusoidal output voltage can be achieved.

The power converters can have the structure of a three-point invertor or of a two-point invertor. The individual power converters can also be constructed from two power converter elements. In this case, the primary winding of the output transformers is arranged between the two power converter elements.

Further exemplary embodiments emerge from the corresponding dependent claims.

The advantage of the structure according to the invention consists in the fact that, in contrast to the prior art, fewer power converter stages are necessary for achieving a binary stepped output voltage. This means that the production cost can be kept low. Furthermore, the switching frequency of the main power converter can be kept low (=fundamental frequency). This has a positive effect on the efficiency. A significant advantage of the novel circuit arrangement also resides in the fact that the advantages of the series circuit of GTOs (redundancy, availability) can be utilized economically in a large spectrum of installation powers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
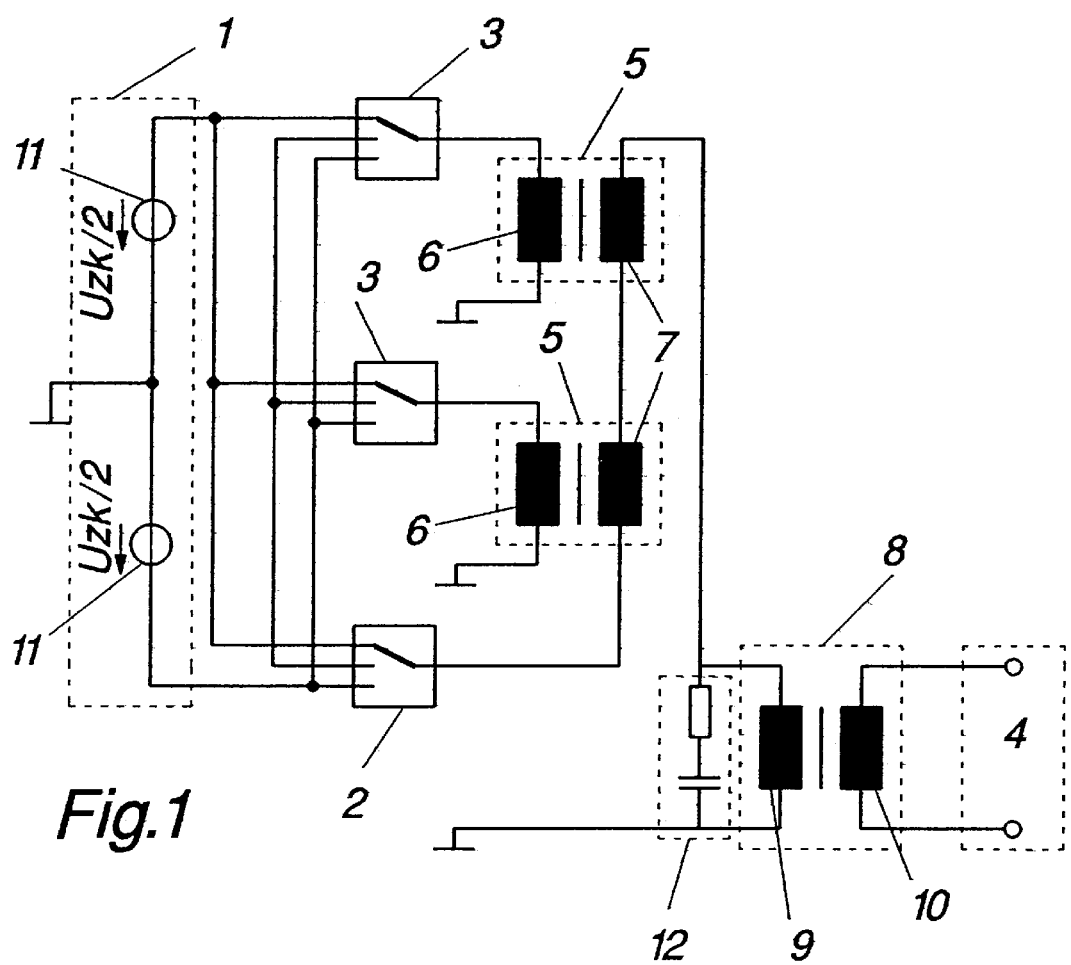
FIG. 1 shows a first exemplary embodiment of the invention.

The reference numerals used in the drawings and their meanings are summarized in the List of Designations.

DESCRIPTION OF THE PREFERRED EMBODIMENTS

Referring now to the drawings, wherein like reference numerals designate identical or corresponding parts throughout the several views, FIG. 1 shows a first exemplary embodiment of the invention. 1 designates a DC voltage intermediate circuit. This is represented by two DC voltage sources 11 each having half the intermediate circuit voltage $U_{zk}/2$. A first power converter 2 and two further power converters 3 are connected in a parallel circuit to the DC voltage intermediate circuit 1. The two power converters 3 each have an output transformer 5 on their load-side output. One terminal of the primary winding 6 of the output transformers 5 is connected to the neutral point of the intermediate circuit and the other terminal is connected to the load-side output of the power converters 3. A load transformer 8 which feeds a load circuit 4 is additionally provided. The load circuit 4 may constitute a railway grid, for example, while the DC voltage intermediate circuit 1 is fed by a voltage supply network. The primary winding 9 of the load transformer 8 forms a series circuit with the secondary windings 7 of the output transformers 5 and the load-side output of the first power converter 2. Consequently, all the output voltages of the power converters 2 and 3 are summed via the primary winding of the load transformer 8 and are transmitted to the load circuit 4 via the load transformer 8 with a specific turns ratio.

Figure 4:
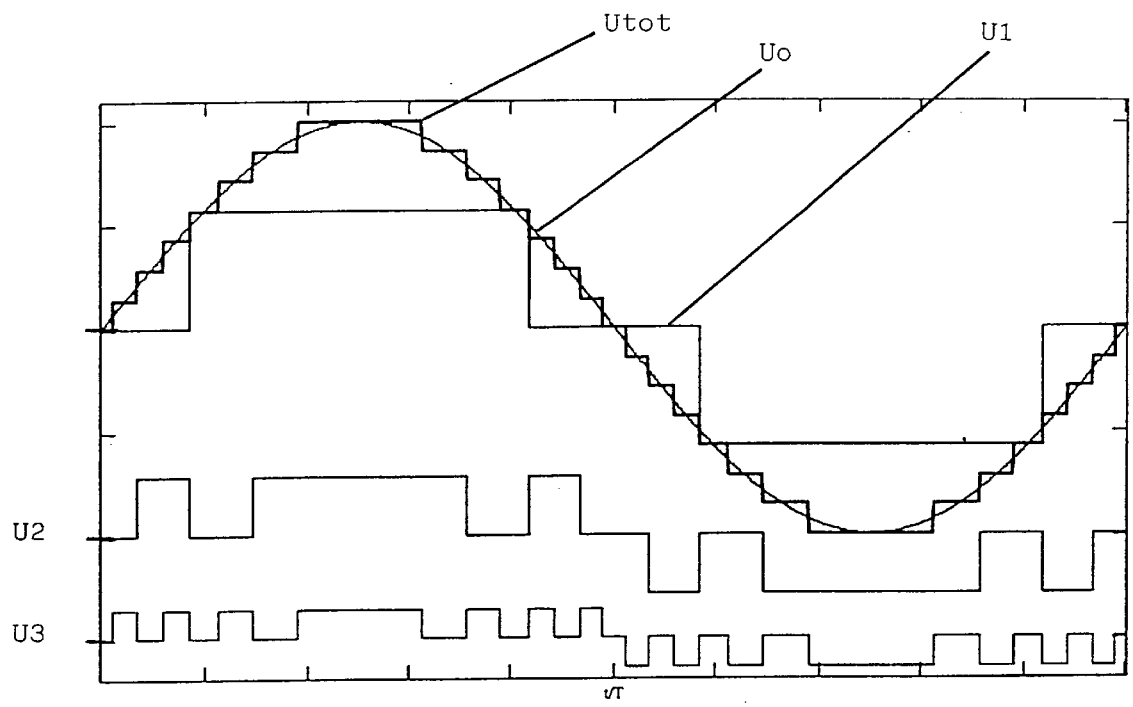
FIG. 4 shows voltage profiles for a circuit arrangement having the turns ratios of the output transformers 4:1 and 2:1.
Figure 5:
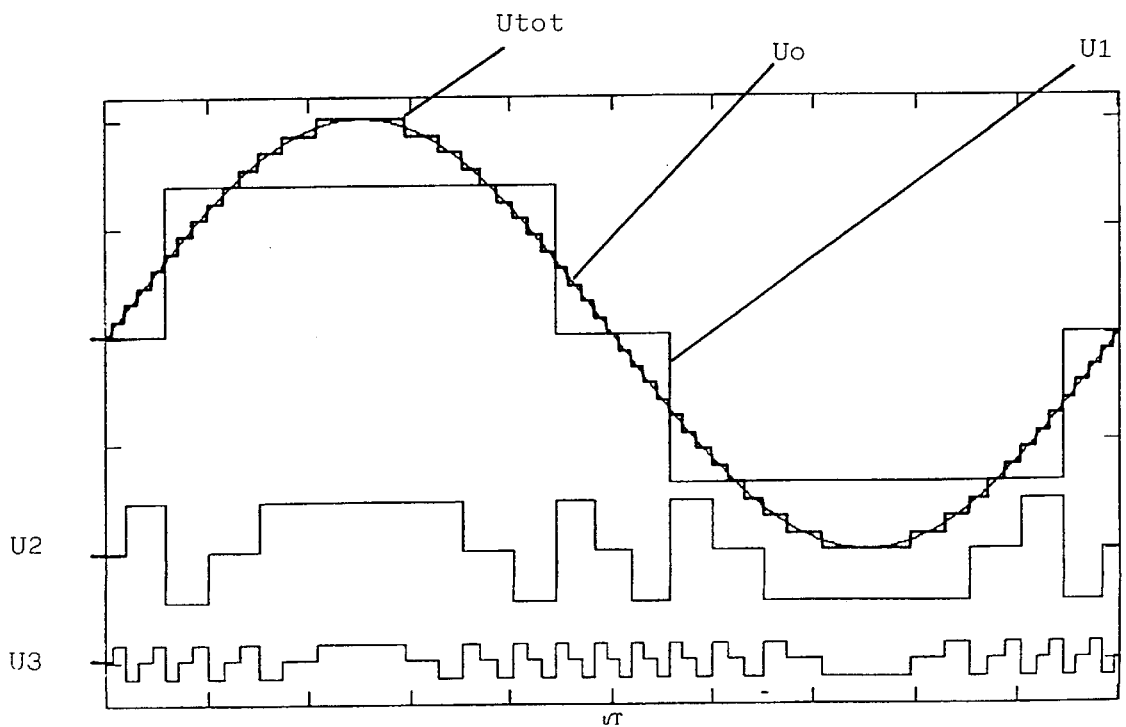
FIG. 5 shows voltage profiles for a circuit arrangement having the turns ratios of the output transformers 9:1 and 3:1.

If, then, the turns ratio of the output transformers 5, that is to say the ratio of the number of turns of the primary winding to the number of turns of the secondary winding, the primary winding facing the outputs of the power converters 3, is selected to be greater than one, the further power converters 3 form fine stages. The circuit arrangement according to the invention enables the sine function to be approximated by switching the individual power converters in and out. The ideal sinusoidal voltage profile in the load circuit can be better approximated by means of corresponding driving of the power converters. FIG. 4 shows the corresponding voltage profiles with turns ratios of the output transformers 5 of 4:1 and 2:1. FIG. 5 shows corresponding profiles for turns ratios 9:1 and 3:1. U1 designates the ideal output voltage of the first power converter 2, U2 designates that of the power converter 3 whose output transformer has a turns ratio of 2:1 and 3:1, respectively, and U3 designates that of the power converter 3 whose output transformer has a turns ratio of 4:1 and 9:1, respectively. Utot represents the sum of the voltages U1, U2 and U3, and Uo represents the sinusoidal voltage profile to be approximated. The binary or ternary gradation of the turns ratios comes into consideration because the calculation of the driving pattern and resultant control command sequences are constructed in a simple manner. However, other, even odd turns ratios would also be conceivable and would not change anything in the fundamental circuit arrangement.

It is evident from FIGS. 4 and 5 that the further power converters 3 have to be clocked at a higher frequency than the first power converter 2. A very good approximation to the sinusoidal waveform is achieved with the circuit according to the invention. The gradation of the turns ratios of the output transformers also renders the use of an uneconomically large number of stages unnecessary, although an even finer approximation of the sinusoidal waveform could, of course, be achieved with even more stages.

Figure 2:
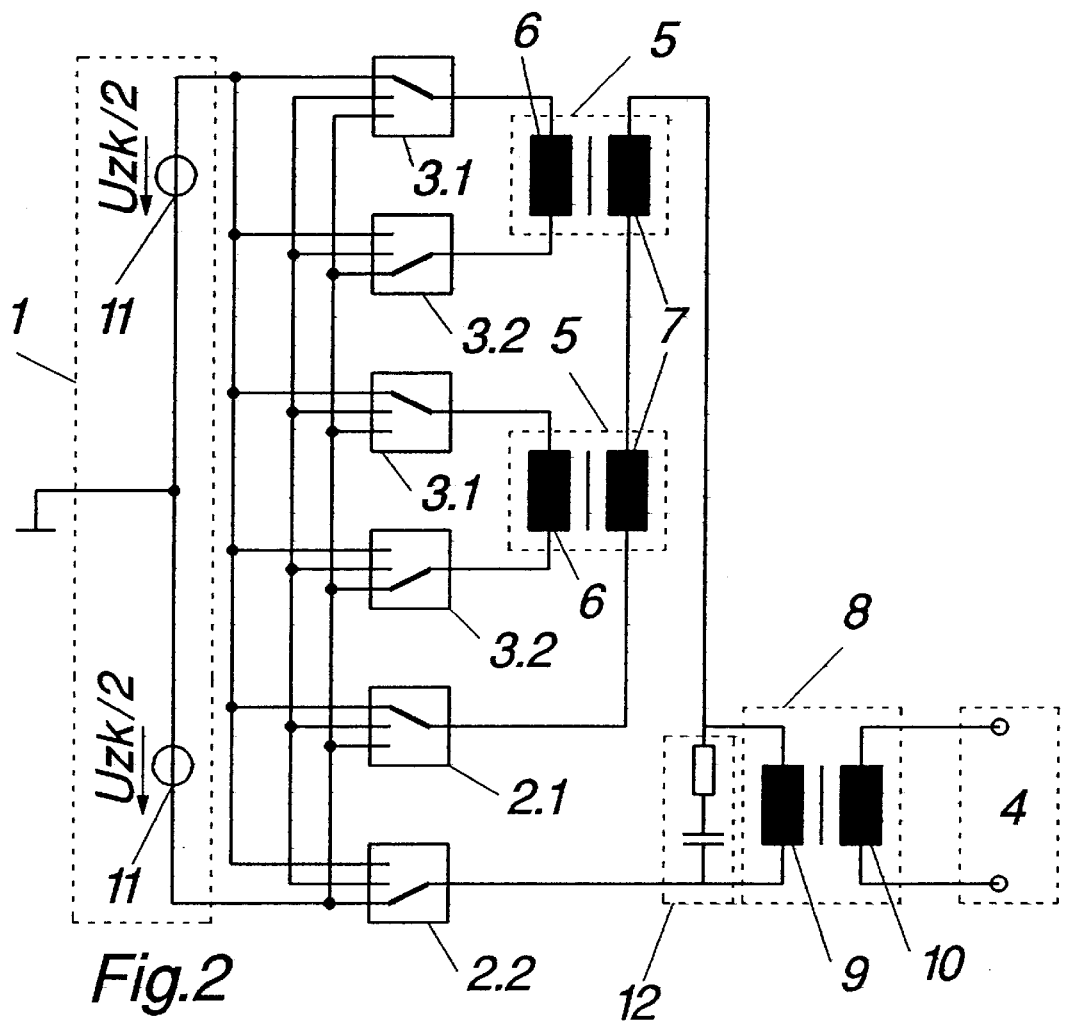
FIG. 2 shows a second exemplary embodiment of the invention.

FIG. 2 shows a further exemplary embodiment of the invention, in which the power converters are constructed from two converter elements 2.1, 2.2, 3.1, 3.2 in each case. In this arrangement, the primary windings 6 of the output transformers 5 are no longer connected to the output of the power converter and ground, but rather are connected between each two power converter elements 3.1 and 3.2. The primary winding 9 of the load transformer 8 is once again connected in series with the secondary windings 7, but also, in this case, with the two power converter elements 2.1 and 2.2 of the first power converter. Consequently, once again the output voltages of all the power converters and output transformers are summed and transmitted to the load circuit via the load transformer 8.

The advantage of the arrangement according to FIG. 2 consists in the fact that the output voltage can be controlled by phase-shifted driving of the power converter elements of a power converter block in terms of amplitude and phase angle with respect to the grid to be supplied. With a maximum drive level, the adjacent power converter elements 2.1, 2.2 and 3.1, 3.2 are driven in an exactly inverted manner. This doubles the output voltage in comparison with the arrangement according to FIG. 1. The controlling (that is to say decreasing or increasing of the output voltage) is effected by mutually shifting the pulse patterns through the control angle ±ε. The phase angle of the output voltage with respect to the grid voltage is produced by jointly shifting all six pulse patterns through the angle δ. With regard to the output voltage, the resultant relationship is that the ratio of the instantaneous output voltage to the maximum output voltage is equal to cos(ε).

An output filter 12 in the form of an RC element is additionally provided in parallel with the primary winding of the load transformer 8. It has the tasks of filtering small unavoidable switching offsets of those power converters which should theoretically switch simultaneously.

Figure 3:
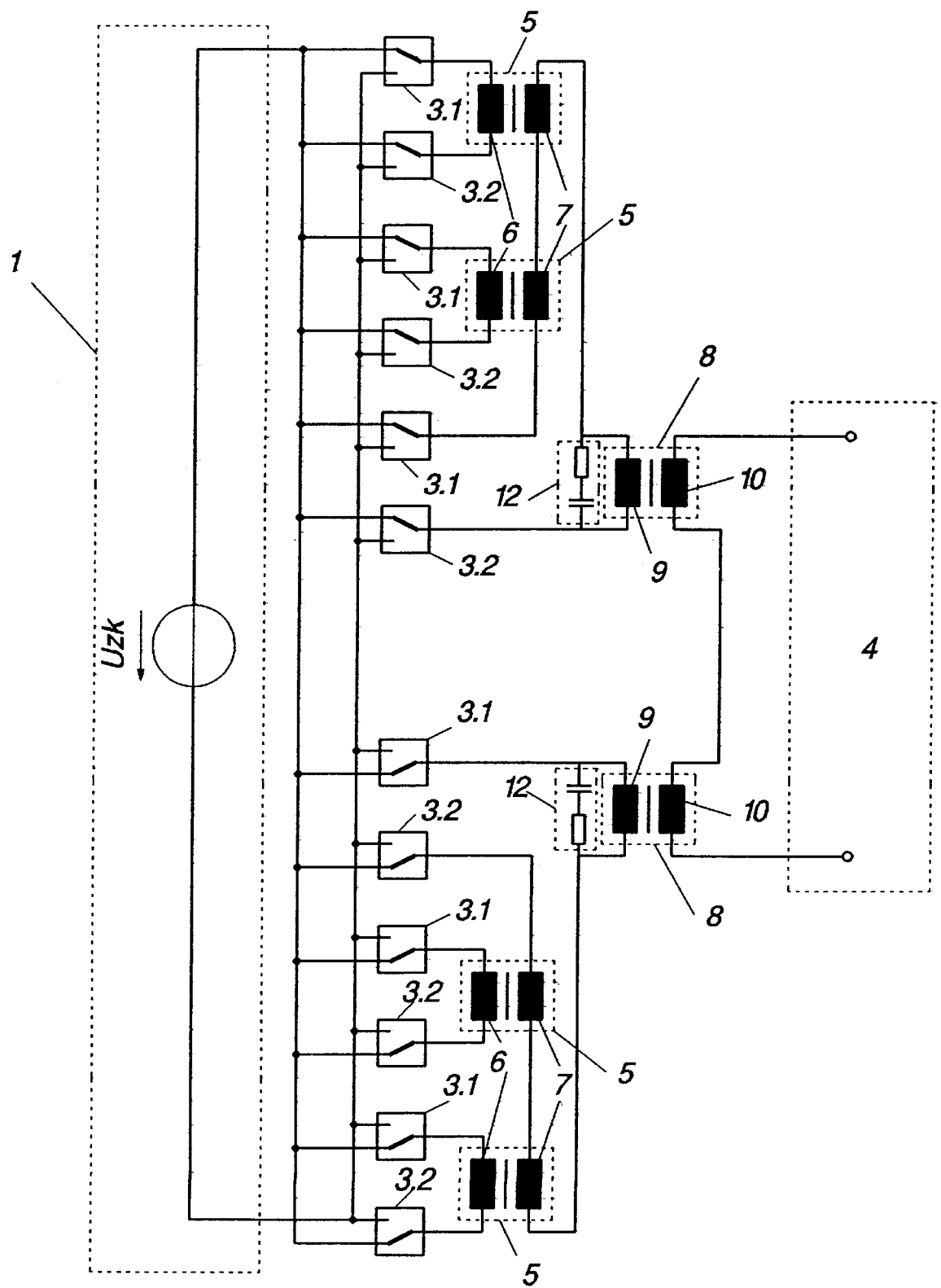
FIG. 3 shows a third exemplary embodiment of the invention.

The examples according to FIGS. 1 and 2 use three-point invertors as power converter blocks. It is, of course, also possible to construct a corresponding circuit arrangement using two-point invertors. FIG. 3 shows a corresponding exemplary embodiment. The circuit is of mirror-symmetrical construction and comprises an upper half and a lower half. In the case of a maximum drive level, the power converters of the upper half are driven in a manner exactly the inverse of those of the lower half. Control of the output voltage and of the phase angle is obtained in a manner analogous to the example according to FIG. 2 by phase-shifted clocking of the upper power converter groups with respect to the lower power converter groups. The secondary winding of the load transformer of the upper half is connected in series with that of the lower half.

Overall, the invention yields a circuit arrangement with which a good approximation to the sine function can be achieved in an economical manner.

Obviously, numerous modifications and variations of the present invention are possible in light of the above teachings. It is therefore to be understood that within the scope of the appended claims, the invention may be practised otherwise than as specifically described herein.

What is claimed as new and desired to be secured by Letters Patent of the United States is:

1. A power converter circuit arrangement comprising a DC voltage intermediate circuit and a first power converter and at least one further power converter, which are connected to the DC voltage intermediate circuit and feed a load circuit, in particular a single-phase railway grid, each at least one further power converter (3) having an output transformer on the load side; wherein (a) a load transformer is provided, a secondary winding of which feeds the load circuit; and (b) a secondary winding of each output transformer is connected in series with a primary winding of the load transformer and load-side terminals of the first power converter.

2. The power converter circuit arrangement as claimed in claim 1, wherein each output transformer has a turns ratio of greater than 1.

3. The power converter circuit arrangement as claimed in claim 2, further comprising at least two further power converters, and wherein the turns ratio between the output transformers corresponding to the at least two further power converters is gradated in a binary or ternary manner.

4. The power converter circuit arrangement as claimed in claim 3, wherein a total of three power converters, namely the first power converter and the two further power converters are provided, and wherein the turns ratio of the output transformers of the two further power converters is 3:1 and 9:1.

5. The power converter circuit arrangement as claimed in claim 3, wherein a total of three power converters, namely the first power converter and the two further power converters are provided, and wherein the turns ratio of the output transformers of the two further power converters is 2:1 and 4:1.

6. The power converter circuit arrangement as claimed in claim 3, wherein the first power converter and the at least two further power converters each comprise a first power converter element and a second power converter element, the primary windings of the output transformers corresponding to the at least two further power converters being fed by the two power converter elements of the at least two further power converters and the secondary windings of the output transformers forming a series-connected circuit with the primary winding of the load transformer and the two power converter elements of the first power converter.

7. The power converter circuit arrangement as claimed in claim 1, wherein the first power converter and the at least one further power converter or the corresponding power converter elements have a structure of a three-point invertor, and wherein the DC voltage intermediate circuit has a positive terminal, a negative terminal and a neutral terminal.

* * * * *